United States Patent [19]

Hayasaki

[11] Patent Number: 5,113,724

[45] Date of Patent: May 19, 1992

[54] CONTROL SYSTEM FOR AN AUTOMATIC AUTOMOTIVE TRANSMISSION

[75] Inventor: Koichi Hayasaki, Fujisawa, Japan

[73] Assignee: Nissan Motor Co., Ltd., Yokohama, Japan

[21] Appl. No.: 512,191

[22] Filed: Apr. 20, 1990

[30] Foreign Application Priority Data

Apr. 27, 1989 [JP] Japan .................... 1-108153

[51] Int. Cl.⁵ .............................................. B60K 41/12
[52] U.S. Cl. .................................................. 74/867
[58] Field of Search ............... 74/867, 868; 192/109 F

[56] References Cited

U.S. PATENT DOCUMENTS

| | | | |
|---|---|---|---|
| 4,570,511 | 2/1986 | Nishimura et al. | 74/867 |
| 4,680,992 | 7/1987 | Hayasaki et al. | 74/869 |
| 4,729,265 | 3/1988 | Sugano | 74/867 X |
| 4,730,521 | 3/1988 | Hayasaki et al. | 74/867 |
| 4,807,496 | 2/1989 | Hayasaki et al. | 74/867 X |
| 4,827,805 | 5/1989 | Moan | 74/867 |

FOREIGN PATENT DOCUMENTS 62-62047  3/1987  Japan .
62-88856  4/1987  Japan .

Primary Examiner—Leslie A. Braun
Assistant Examiner—Ryan W. Massey
Attorney, Agent, or Firm—Foley & Lardner

[57] ABSTRACT

A selection valve which is responsive to the transmission being conditioned to produce D-RANGE is used to switch communication between an accumulator chamber and two different circuits (for example circuits which are used during the production of 3rd speed and reverse gear).

7 Claims, 7 Drawing Sheets

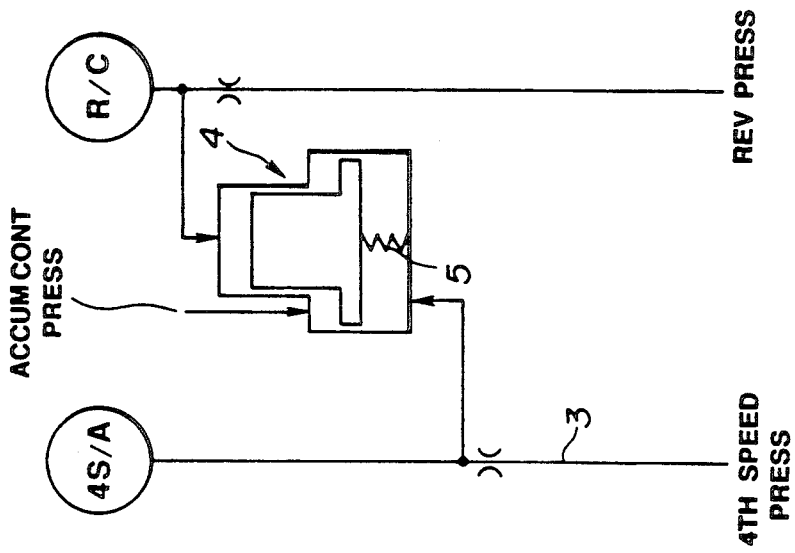
FIG. 5 *PRIOR ART*
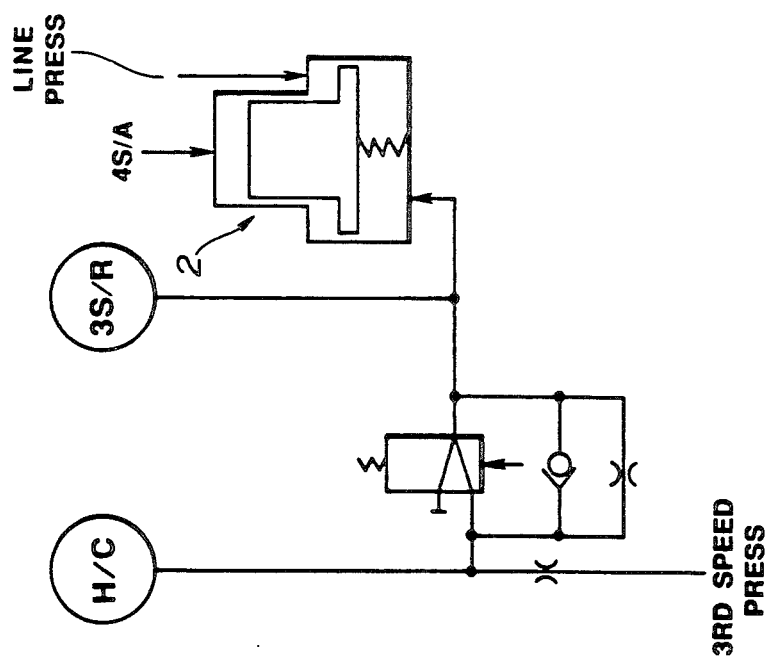
FIG. 4 *PRIOR ART*

FIG. 8
*PRIOR ART*

| GEAR RATIO / FRICTION ELEMENT | | R/C | H/C | F/C | B/B | L&R/B |
|---|---|---|---|---|---|---|
| REVERSE | | ○ | | | | ○ |
| FORWARD | 1ST | | | ○ | | |
| | 2ND | | | ○ | ○ | |
| | 3RD | | ○ | ○ | | |
| | 4TH | | ○ | ○ | ○ | |

5,113,724

CONTROL SYSTEM FOR AN AUTOMATIC AUTOMOTIVE TRANSMISSION

BACKGROUND OF THE INVENTION

1. Field of the Invention

The present invention relates to a automatic automotive transmission and more specifically to a hydraulic spool valve control arrangement for such a transmission which has an accumulator which can be selectively connected with two different circuits by a selector valve.

2. Description of the Prior Art

JP-A-62-62047 discloses a transmission of the type which includes: a forward clutch, a high clutch, a band brake and a reverse clutch. The level of the line pressure which is used to engage these elements is controlled in accordance with engine load (as indicted by the throttle pressure produced by a throttle valve).

With this type of transmission, when it is conditioned for D-RANGE operation, 1st speed is produced by engagement of the forward clutch. 2nd speed is produced by engagement of the forward clutch and the band brake, 3rd speed is produced by engagement of the forward clutch and a high clutch, while 4th speed is produced by engagement of the high clutch and the band brake. When the transmission is conditioned to produce R-RANGE (viz., reverse) the reverse clutch alone is engaged.

As is conventional, shift valves are arranged to be responsive to the throttle pressure (engine load) and a governor pressure which is representative of vehicle speed, and to control the above listed engagements in a manner to selectively produce 1st, 2nd, 3rd and 4th forward gears.

It should be noted that in this type of transmission the band brake is operated by a servo having a 2nd speed apply chamber, a 3rd speed release chamber and a 4th speed apply chamber. With this particular arrangement when the 2nd speed apply chamber is supplied with line pressure, the band brake is applied, when the 3rd speed release chamber is pressurized, the band brake is released irrespective of the presence of line pressure in the second speed apply chamber. When the 4th speed apply chamber is pressurized the brand brake is applied irrespective of the presence of line pressure in the 3rd speed release chamber.

When any of the above mentioned friction elements are supplied with line pressure and engaged, a substantial shift shock tends to be produced. In order to overcome this problem the arrangements depicted in FIGS. 4 and 5 have been proposed.

In the FIG. 4 arrangement, when an upshift to third speed is made, the high clutch and the 3rd speed release chamber 3S/R are supplied with line pressure. In order to attenuate shift shock a 2-3 accumulator 2 is provided.

In the FIG. 5 arrangement when an upshift to 4th speed is made, line pressure is supplied to the 4th speed apply chamber 4S/A. In order to attenuate shift shock which tends to be produced, a 3-4 accumulator 4 is provided.

The accumulators 2 and 4 are supplied with control pressures which respectively comprise line pressure and a pressure which is modified in accordance with the load on the engine. The latter mentioned pressure is produced by a non-illustrated accumulator control valve which is responsive to throttle pressure.

The 3-4 accumulator is provided with a spring 5 which urges the stepped accumulator piston in a direction which tends to minimize the volume of a chamber which is fluidly communicated with the reverse clutch R/C. When a N-R selection is made, the pressure which is supplied to the reverse clutch R/C is temporarily reduced by the filling of the chamber and the resultant stroking of the accumulator piston. Accordingly, this arrangement is also capable of reducing N-R select shock in addition to 3-4 shift shock.

However, with the above mentioned 3-4 accumulator the accumulator control pressure has a large effect on the stroking characteristics of the accumulator piston during a N-R select. When the engine speed is low the control pressure is low, and it is possible to select the spring 5 in a manner wherein the appropriate resistance to the stroking of the accumulator piston is possible. However, when the engine idling speed is high, the accumulator control pressure increases. As the accumulator control pressure acts in a direction opposite to the bias of the spring 5, the appropriate resistance to the stroking of the accumulator piston is lost resulting in N-R select shock attenuation being reduced.

SUMMARY OF THE INVENTION

It is an object of the present invention to provide an accumulator arrangement wherein a single accumulator can be used to attenuate shock produced when two different friction elements are supplied with line pressure at different times.

In brief, the above object is achieved by a selection valve which is responsive to the transmission being conditioned to produce D-RANGE is used to switch communication between an accumulator chamber and two different circuits (for example circuits which are used during the production of 3rd speed and reverse gear).

More specifically, the present invention is deemed to comprise a transmission which features: a first friction element to which line pressure is supplied via a first conduit; a second friction element to which line pressure is supplied via a second conduit; an accumulator, the accumulator having a piston and an accumulator chamber to which the piston is exposed; a selection valve, the selection valve being operative to selectively establish fluid communication between the first conduit and the accumulator chamber under a first set of operating conditions and connect the second conduit to the accumulator chamber under a second set of operating conditions.

BRIEF DESCRIPTION OF THE DRAWINGS

FIGS. 4 and 5 schematically show the prior art accumulator arrangements which are discussed in the opening paragraphs of the instant disclosure;

FIG. 8 is a chart showing the relationship between the engagement of the various friction elements shown in FIGS. 6, 7A and 7B and the gear ratios which are produced by the FIG. 6 gear train.

DETAILED DESCRIPTION OF THE PREFERRED EMBODIMENTS

Figure 1:
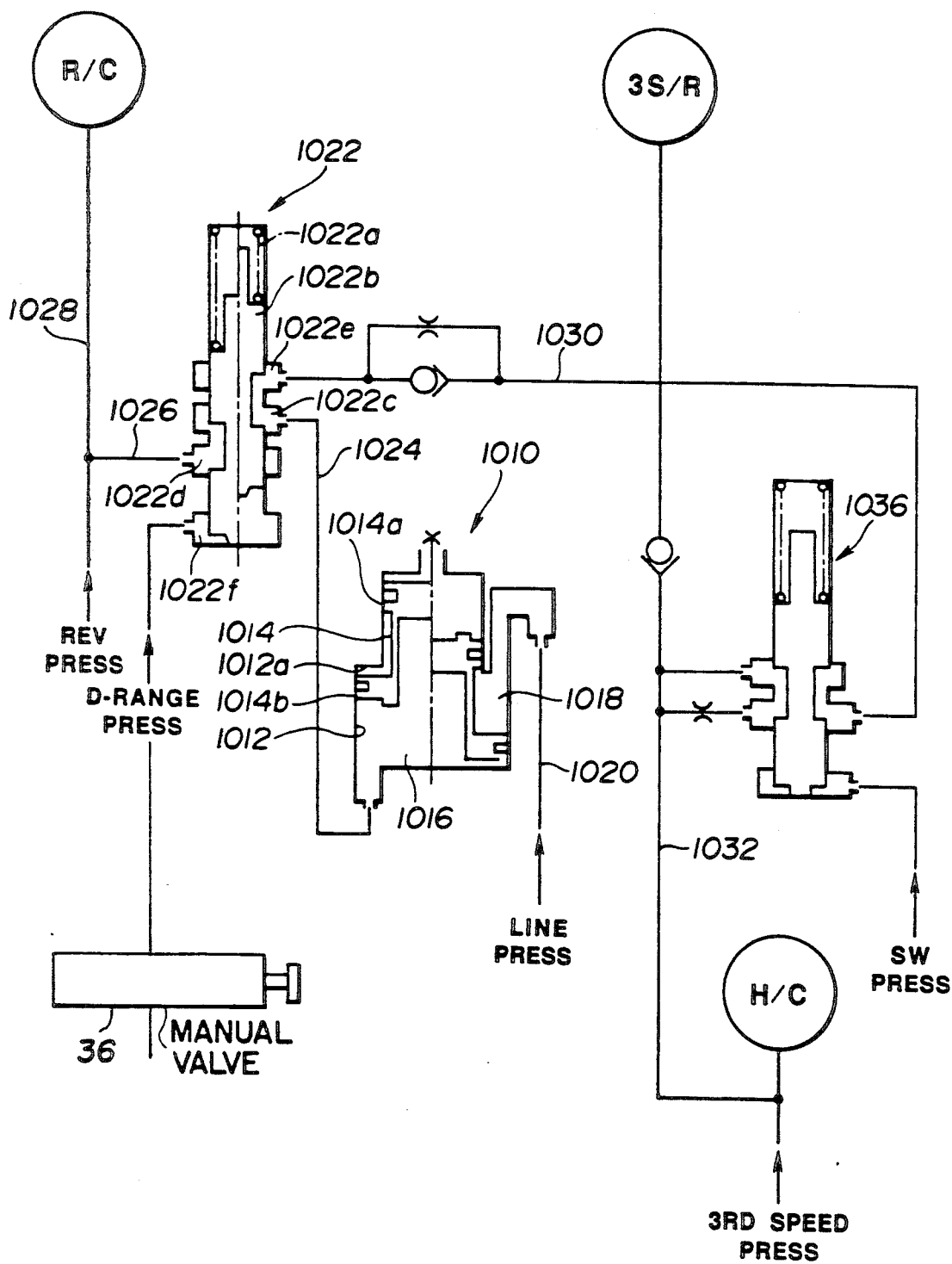
FIG. 1 schematically shows a first embodiment of the present invention.

FIG. 1 shows a first embodiment of the present invention. In this arrangement an accumulator 1010 is defined by a stepped bore 1012 which is formed in a valve body, and a stepped piston 1014 which is reciprocatively received in the bore. In this arrangement the bore is formed with a single step 1012a.

An essentially cylindrical accumulator chamber 1016 is defined in the large diameter end of the bore 1012 while an annular control chamber 1018 is defined between the step 1012a and the large diameter portion of the piston. The chamber defined at the small diameter end of the bore is arranged to be exposed to atmospheric pressure.

The control chamber 1018 is supplied with line pressure by way of conduit 1020. A selection valve 1022 is arranged to selectively switch communication between a first hydraulic circuit which fluidly intercommunicates a 3rd speed release chamber 3S/R and a high clutch H/C, and a second circuit via which the reverse clutch R/C is supplied with line pressure upon reverse gear being manually selected.

This valve includes a spring 1022a which engages one end of a spool 1022b and biases the same in a direction against the pressure which is introduced into the bore through a port 1022f. The spool 1022b is formed with first and second lands which control the communication between ports 1022c, 1022d, and 1022e. When the spool assumes the position illustrated by the left half section communication between ports 1022c and 1022d is established. On the other hand, when the spool assumes the position shown by the right hand half section, communication between ports 1022c and 1022e is established.

Port 1022c fluidly communicates with accumulator chamber 1016 by way of conduit 1024; port 1022d communicates with conduit 1028 which leads to the reverse clutch R/C by way of conduit 1026; and port 1022e communicates with the high clutch H/C and the 3rd speed release chamber 3S/R of the band brake by way of conduit 1030.

Port 1022f is arranged to be supplied with line pressure when the manual valve is set in the D-RANGE position. When line pressure is supplied to port 1022f the bias of the spring is overcome and the spool is moved from the position wherein ports 1022c and 1022d are communicated to a one wherein communication between ports 1022c and 1022e is established.

A 3-2 timing valve 1036 is provided in order to permit the rate at which pressure in the 3rd speed release chamber 3S/R can be drained to be selectively varied and thus control the timing with which the band brake is engaged when a downshift from 3rd to 2nd takes place. The movement of the spool of the 3-2 timing valve is controlled by the application of a control pressure.

In accordance with the present invention when a 2-3 upshift takes place in D-RANGE (viz., with port 1022f supplied with line pressure and the spool 1022b of the selection valve 1022 in the position wherein ports 1022c and 1022e are communicated) the line pressure which is supplied into conduit 1032 is transmitted via conduit 1030 via ports 1022e and 1022c and conduit 1024 to the accumulator chamber 16. Under these circumstances, as the pressure prevailing can act on an area which is larger than that on which the line pressure in the control chamber 1018 acts, the accumulator piston 1014 is induced to stroke in a direction against the bias produced by the pressure prevailing in the control chamber.

During the stroking of the piston the rate at which the pressure level in the high clutch develops is reduced and attenuates engagement shock.

On the other hand, when a N-R select is made, line pressure is supplied into conduit 1028. At this time, line pressure has been drained from port 1022f and the spool of the selection valve 1022 has assumed the position wherein ports 1022c and 1022d are placed in communication. Conduit 1028 is therefore placed in communication with the accumulator chamber 1016. The rate at which pressure builds up in the reverse clutch is temporarily reduced by the stroking of the accumulator piston 1014 and the shock which tends to be produced by the engagement of the reverse clutch R/C is attenuated.

Accordingly, with the first embodiment, it is possible to use a single accumulator to attenuate shock which tends to be produced by two different friction elements or groups of friction elements. Further, as selection valve 1022 is controlled by the pressure which is inherently released into the control system from the manual valve upon being set in D RANGE, the need for a complex control arrangement is obviated and reliable switching of the selection valve 1022 is assured.

Figure 2:
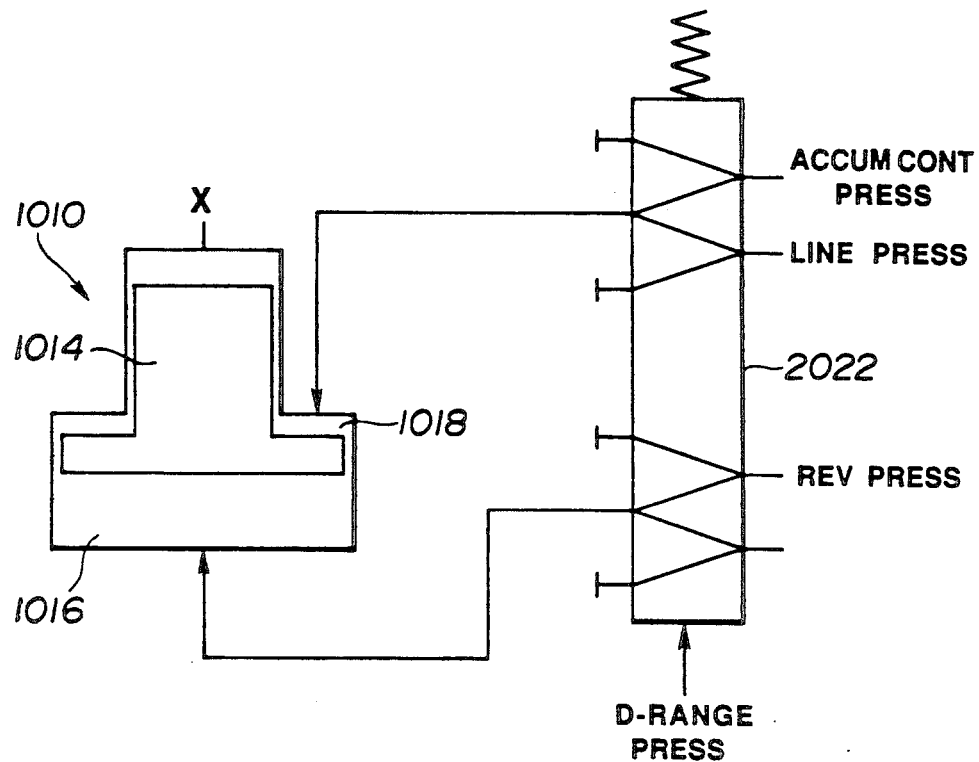
FIG. 2 shows a second embodiment of the present invention.

FIG. 2 schematically shows a valve and accumulator arrangement via which the control pressure can be changed from line pressure to one (viz., an accumulator control pressure) which is variable with engine load or the like, at the same time as the connection between one circuit is changed to another.

Figure 3:
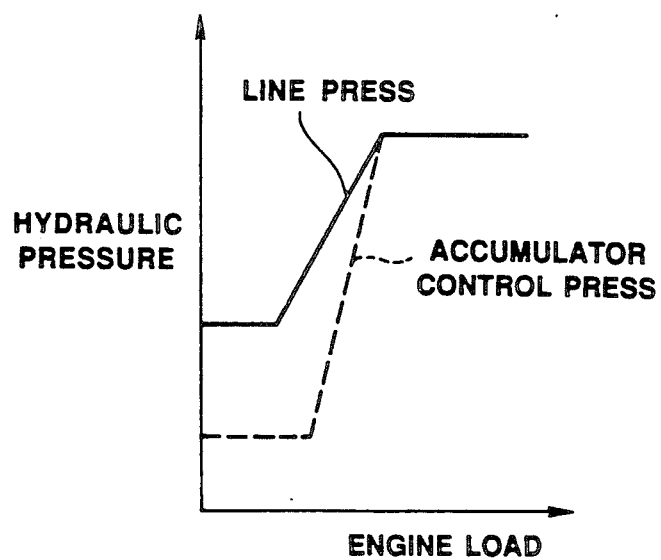
FIG. 3 shows in terms of hydraulic pressure and engine load, the manner in which the line pressure and the accumulator control pressure vary with respect to engine load.

FIG. 3 shows the manner in which the line pressure (solid line trace) and the accumulator control pressure (broken line) vary in accordance with the load on the engine.

With the present invention, by including the above mentioned line/accumulator control pressure switching feature in the selection valve 2022 improved N-R shock attenuation is rendered possible. That is to say, when an N-R select is made and the engine is idling at low speed, the level of the line pressure which is supplied to the reverse clutch R/C is relatively low whereby the corresponding low accumulator control pressure provides the appropriate resistance to piston stroking and enables good select shock attenuation. On the other hand, if the engine speed is raised during idling, such as during engine warm-up or the use of an air-conditioner or the like, the level of both the line and accumulator control pressures are raised to levels at which suitable shock attenuation is achieved. In other words the resistance to the higher line pressure is increased and the appropriate resistance to piston stroking is again achieved.

The above described embodiments and are applicable to the type of control circuit which is disclosed in U.S. Pat. No. 4,730,521 filed on Mar. 15, 1988 in the name of Hayasaki et al. The contents of this document are hereby incorporated by reference.

Figure 6:
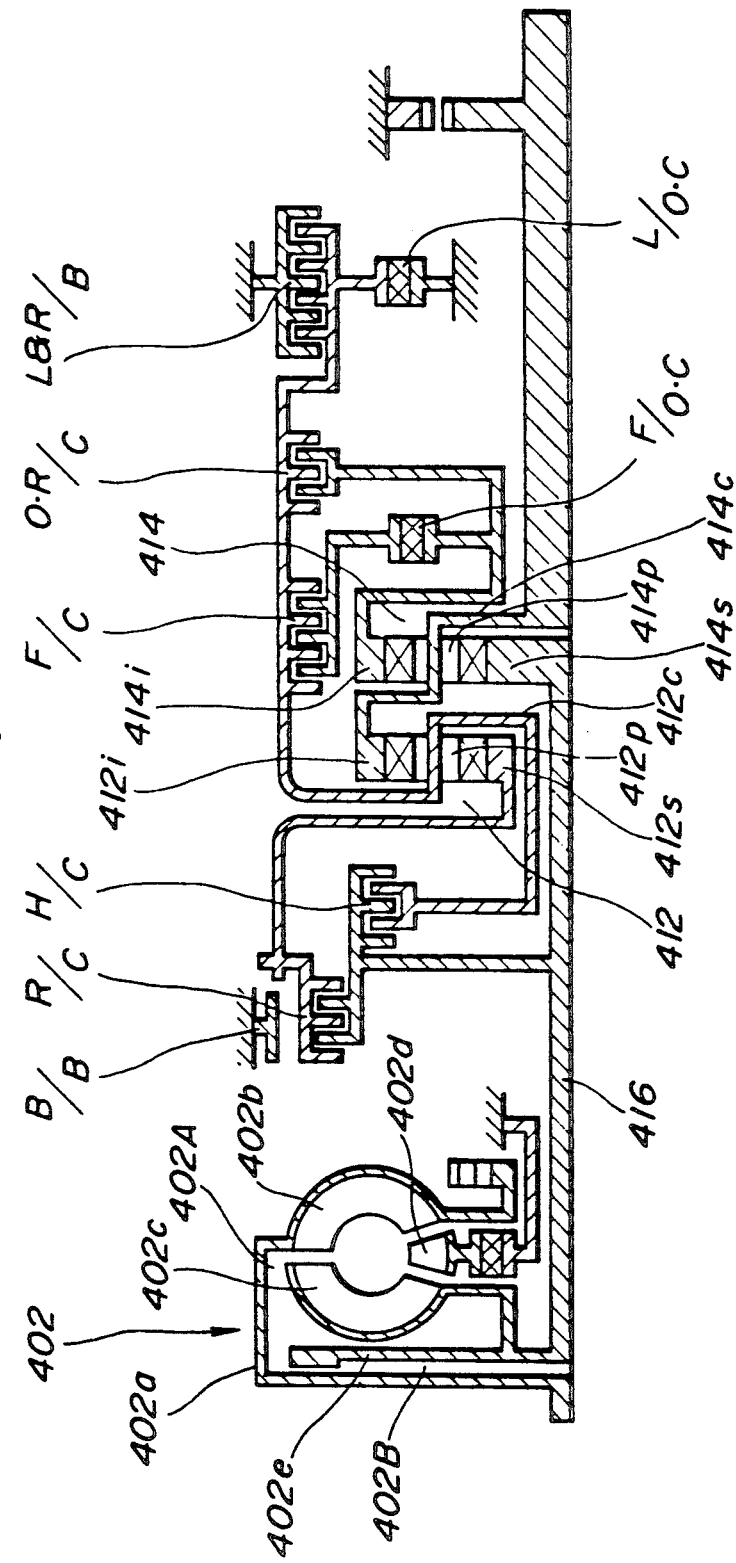
FIG. 6 shows a gear train of the type to which the present invention is applicable.

FIG. 6 shows an engine/transmission power train to which the embodiments of the present invention are applicable and which is disclosed in the above mentioned Patent. This system includes an automatic transmission 401 which is operatively connected by way of torque converter 402 to prime mover (internal combustion engine) not shown.

The transmission in this instance comprises first and second planetary gear units 412 and 414 which are arranged in tandem. As shown in FIG. 6, the forward planetary gear 412 comprises a front sun gear 412s, front pinion gears 412p, a front internal or ring gear 412i and a pinion gear carrier 412c. The rear planetary gear similarly comprises a front sun gear 414s, front pinion gears 414p, a front internal or ring gear 414i and a pinion gear carrier 414c.

In this arrangement a transmission input shaft 416 is arranged to be selectively connectable with the front sun gear 412s by way of a reverse clutch R/C, and selectively connectable with the front planetary gear carrier 412c by way of a high clutch H/C. The front planetary gear carrier 412c is selectively connectable with the rear ring gear 14i by way of a forward clutch F/C; the front sun gear 412s is connectable with the transmission housing through a band brake B/B, the front carrier 412c is selectively connectable with the transmission housing through a low and reverse brake L&R/B.

In addition to this, a forward overrunning clutch F/O.C is arranged between the forward clutch F/C and the rear ring gear 414i; while a low one-way clutch L/O.C is arranged between front planetary gear carrier 412c and the transmission housing. An overrunning clutch O.R/C provides a selective connection between front planetary gear carrier 412c and the rear ring gear 414i and is arranged in parallel with the F/O.C.

By selectively supplying the above listed friction elements with line pressure in accordance with the table shown in FIG. 10, a plurality (4) of forward speeds and one reverse gear ratio can be produced. In this table, the circles denote the friction elements which are supplied with the above mentioned line pressure.

It should be also noted that with the gear train illustrated in FIG. 6 the forward overrunning clutch F/O.C is arranged such that when the front planetary gear 412c and the rear ring gear 414i are prevented from rotating in the opposite direction from one another.

It should also be noted that even though it is not shown in the table shown in FIG. 8, when the above mentioned overruning clutch O.R/C is engaged, the function of the forward overrunning clutch is negated and engine braking is rendered possible.

Figure 7A:
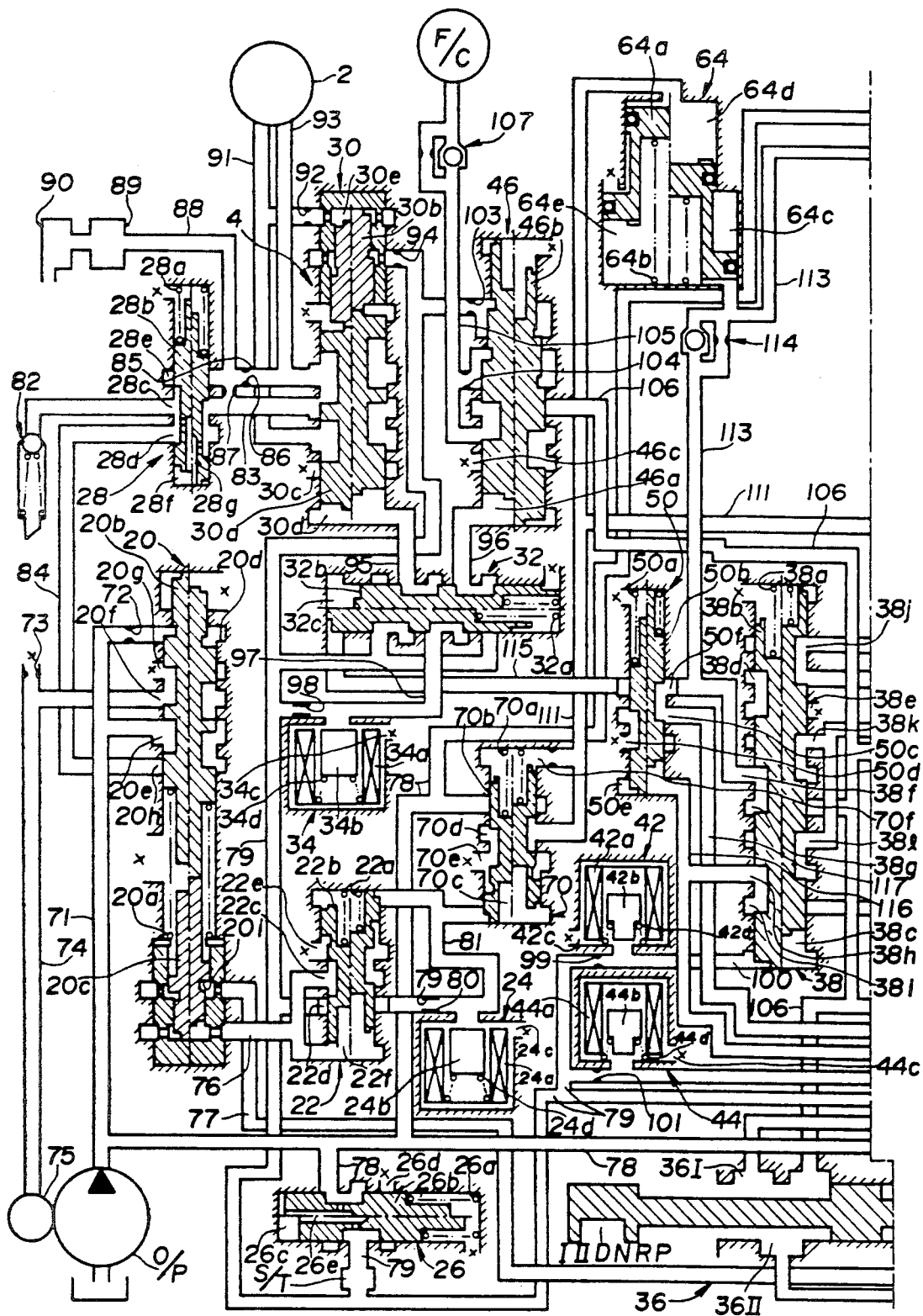
FIGS. 7A and 7B show a hydraulic control circuit which is used to control the gear train shown in FIG. 6
Figure 7B:
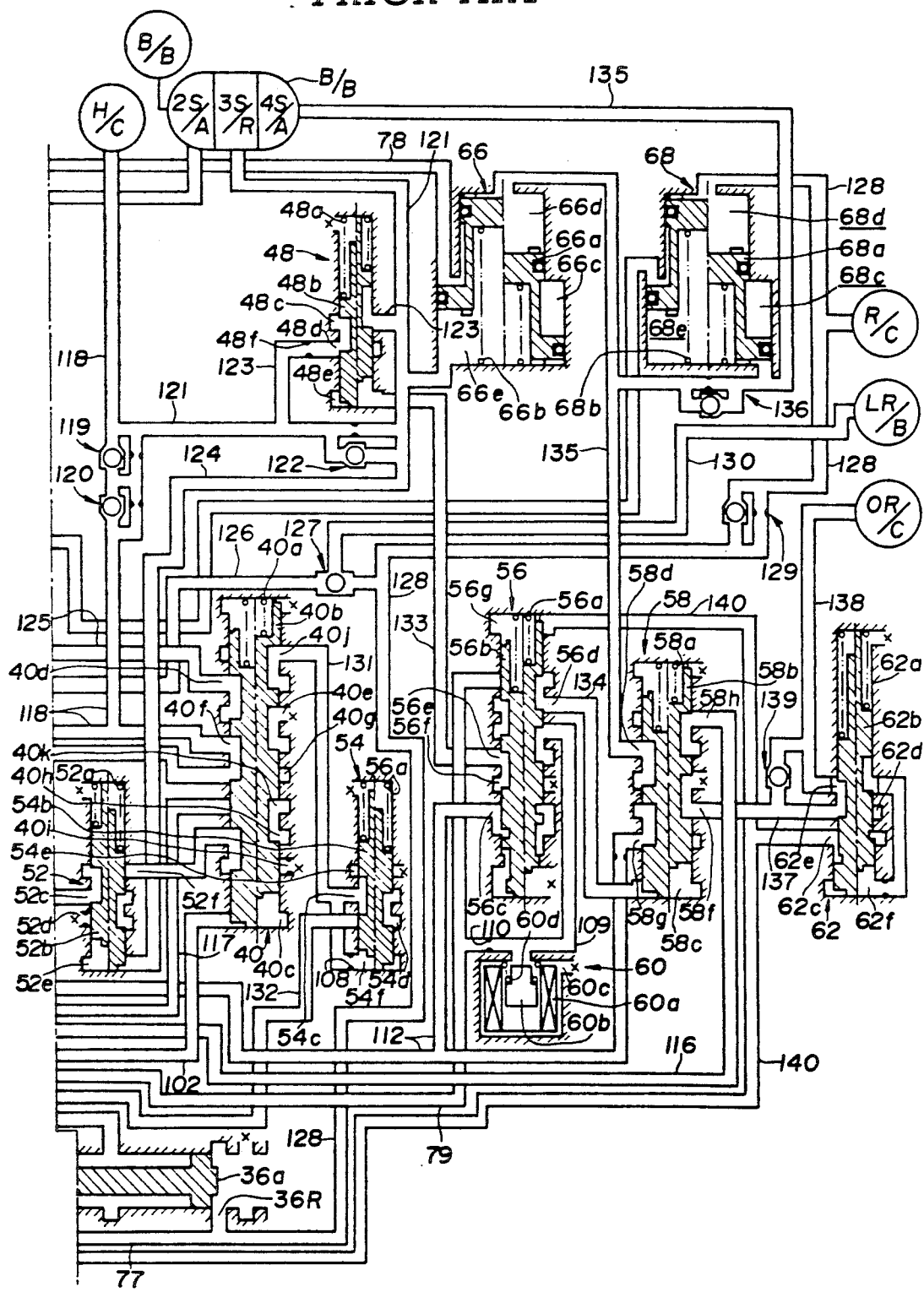

FIGS. 7A and 7B show a hydraulic control circuit by which the above mentioned friction elements are selectively engaged and disengaged. This circuit includes a pressure regulator valve 20, a pressure modifier valve 22, a line pressure solenoid 24, a pilot valve 26, a torque converter regulator valve 28, a lock-up control valve 30, a shuttle valve 32, a lock-up solenoid 34, a manual valve 36, a first shift valve 38, a second shift valve 40, a first shift solenoid 42, a second shift solenoid 44, a forward clutch control valve 46, a 3-2 timing valve 48, a 4-2 relay valve 50, a 4-2 sequence valve 52, a first range pressure reducing valve 54, a shuttle valve 56, a overrunning clutch control valve 58, a third shift solenoid 60, an overrunning clutch pressure reducing valve 62, a second speed servo apply pressure accumulator 64, a third speed release pressure accumulator 66, a fourth speed servo apply pressure accumulator 68 and an accumulator control valve 70.

The above listed elements cooperate in a manner to control the supply of line pressure hydraulic fluid from the pressure modifier valve 22 to the reverse clutch R/C, high clutch H/C, the forward clutch F/C, band brake B/B, low and reverse brake L&R/B, and the overrunning clutch O.R/C in response to the shifting of the first and second shift valves 38, 40.

It should be further noted that band brake servo BS which operates the band brake B/B includes a second speed servo apply chamber 2S/A, a third speed servo release chamber 3S/R and a fourth speed apply chamber 4S/A. When the second speed apply chamber 2S/R is supplied with line pressure the band brake is applied. However, when the third speed release chamber 3S/R is supplied with line pressure, even though the second speed apply chamber continues to be supplied with pressure, the band brake is released. Further, when the fourth speed apply chamber is pressurized, irrespective of the supply of pressure into the other two, the band brake is applied.

The shifting of the first and second shift valves 38, 40 is controlled by the first and second shift solenoids 42, 44, respectively. When these solenoids are energized, pilot pressure is supplied to the shift valves 38, 40 and the spool valve elements thereof assume the positions indicated by the right-hand half sections. On the other hand, when the solenoids are de-energized, the chambers into the pilot pressure is supplied, are drained and the spool valve elements assume the positions indicated by the left-hand half sections.

It will of course be appreciated that the present invention is not limited to the disclosed reverse and third speed circuits and can be applied to any two circuits which are pressurized at different times. Further, the present invention is not limited to the use of a single selection valve nor accumulators wherein only two accumulator chambers are used. That is to say, it is within the scope of the present invention to provide a number of selection valves in combination with an accumulator (or accumulators) having 3 or more chambers which can be selectively pressurized.

What is claimed is:

1. In a transmission
 a first friction element to which line pressure is supplied via a first conduit;
 a second friction element to which line pressure is supplied via a second conduit;
 an accumulator, said accumulator having a piston and an accumulator chamber to which said piston is exposed;
 a manual valve which is arranged to output a D-Range indicative line pressure signal when set in a D-range;
 a selection valve which is operatively connected with said manual valve and responsive to the D-Range indicative signal which is output therefrom, said selection valve being operative to selectively establish fluid communication between said first conduit and said accumulator chamber under a first set of operating conditions wherein the D-Range indicative line pressure signal is present and connect said second conduit to said accumulator chamber under a second set of operating conditions wherein the D-Range indicative line pressure signal is absent.

2. A transmission as claimed in claim 1 wherein said accumulator further comprises a control chamber, said control chamber being arranged to receive a control pressure in a manner to produce a bias which tends to move the accumulator piston in a direction which minimizes the volume of said accumulator chamber.

3. A transmission as claimed in claim 2 wherein said selection valve is supplied first and second control pressures and arranged to supply a first control pressure to said control chamber under the conditions communication between said first conduit and said accumulator chamber is established, and to supply the second control pressure to the control chamber under the conditions communication between said second conduit and said accumulator chamber is established.

4. A transmission as claimed in claim 3 wherein said first control pressure is line pressure and said second control pressure is a pressure which varied in accordance a parameter which varies with the load on the transmission.

5. In a transmission
   a first friction element to which line pressure is supplied via a first conduit;
   a second friction element to which line pressure is supplied via a second conduit;
   an accumulator, said accumulator having a piston and an accumulator chamber to which said piston is exposed;
   a selection valve, said selection valve being operative to selectively establish fluid communication between said first conduit and said accumulator chamber under a first set of operating conditions and to connect said second conduit to said accumulator chamber under a second set of operating conditions;
   said transmission having a manual valve which, when set in D-Range, permits line pressure to be supplied to a control chamber of said selection valve, said selection valve being responsive to the presence of line pressure in said control chamber to establish communication between the first conduit and said accumulator chamber, and responsive to the absence of pressure in said control chamber to establish communication between the second conduit and the accumulator chamber.

6. A transmission as claimed in claim 5 wherein said selection valve further includes means for permitting the control chamber of the accumulator to be supplied with the control pressure under the first set of operating conditions, and for supplying the control chamber of the accumulator with a different control pressure which varies with engine load under the second set of operating conditions.

7. In a transmission
   a first friction element to which line pressure is supplied via a first conduit;
   a second friction element to which line pressure is supplied via a second conduit;
   an accumulator, said accumulator having a piston and an accumulator chamber to which said piston is exposed;
   a selection valve which is responsive to a hydraulic pressure signal which is produced when the transmission is operating under a first set of operating conditions, said selection valve being operative to selectively establish fluid communication between said first conduit and said accumulator chamber under the first set of operating conditions wherein the hydraulic pressure signal is present, and to connect said second conduit to said accumulator chamber under a second set of operating conditions wherein the hydraulic pressure signal is absent.

* * * * *